(12) United States Patent
O'Daniel

(10) Patent No.: US 6,354,787 B1
(45) Date of Patent: Mar. 12, 2002

(54) DOUBLE CONTAINER TRAILER APPARATUS AND METHOD OF USE

(75) Inventor: Harold W. O'Daniel, Mansfield, TX (US)

(73) Assignee: G & H Manufacturing Ltd., Fort Worth, TX (US)

( * ) Notice: Subject to any disclaimer, the term of this patent is extended or adjusted under 35 U.S.C. 154(b) by 0 days.

(21) Appl. No.: 09/481,427

(22) Filed: Jan. 12, 2000

(51) Int. Cl.$^7$ .............................................. B65G 67/02
(52) U.S. Cl. ..................... 414/494; 414/500; 414/515
(58) Field of Search .............................. 414/494, 500, 414/515; 254/371

(56) References Cited

U.S. PATENT DOCUMENTS

| | | | | |
|---|---|---|---|---|
| 2,512,339 A | * | 6/1950 | Knap, Jr. ..................... | 414/515 |
| 2,741,383 A | | 4/1956 | Leckert ....................... | 214/505 |
| 2,909,295 A | * | 10/1959 | Weir ........................... | 414/515 |
| 3,001,825 A | | 9/1961 | Rouse ........................... | 298/8 |
| 3,077,278 A | * | 2/1963 | Alexander ................... | 414/494 |
| 3,894,644 A | * | 7/1975 | Alexaneder ................. | 414/494 |
| 4,704,063 A | * | 11/1987 | Updike, Jr. et al. ......... | 414/500 |
| 4,954,039 A | * | 9/1990 | Johnston et al. ............. | 414/500 |
| 5,246,330 A | | 9/1993 | Marmur ....................... | 414/494 |
| 5,460,473 A | | 10/1995 | LaMora ....................... | 414/494 |

FOREIGN PATENT DOCUMENTS

| | | | | |
|---|---|---|---|---|
| RU | 286668 | * | 2/1971 | ................. 414/494 |

* cited by examiner

Primary Examiner—Steven A. Bratlie
(74) Attorney, Agent, or Firm—Bracewell & Patterson, LLP

(57) ABSTRACT

A double container trailer is shown having a main trailer frame including a front trailer frame and a rear trailer frame, both of which define a top support surface. The rear trailer frame has a tilt frame pivotally mounted thereon for supporting a first load bearing container. A pivot mechanism is connected between the rear trailer frame and the tilt frame for pivoting the tilt frame and its associated container about a pivot point located on the rear trailer frame. A primary cable drive located on the rear trailer frame engages a first load bearing container for transporting the first container onto the top support surface of the main trailer frame to an initial transport position. A secondary cable drive engages the first load bearing container and moves the container to a final transport position forward of the initial transport position. The secondary drive includes a winch drum having a threaded external surface which defines a series of thread grooves and a forward cable, the forward cable being wound onto the threaded external surface of the winch drum and extending in either of opposite directions between spaced sheaves located on the trailer main frame.

15 Claims, 7 Drawing Sheets

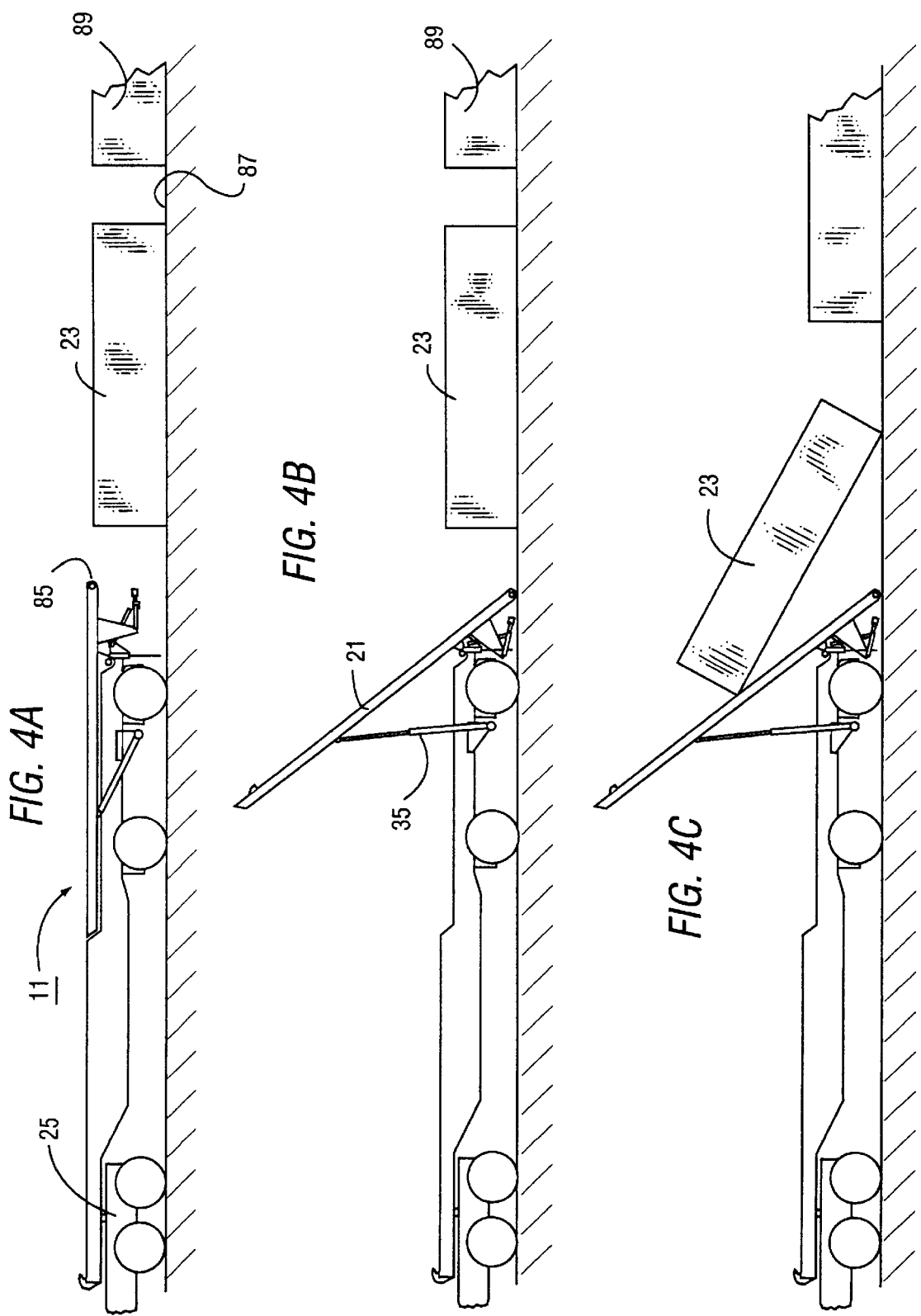

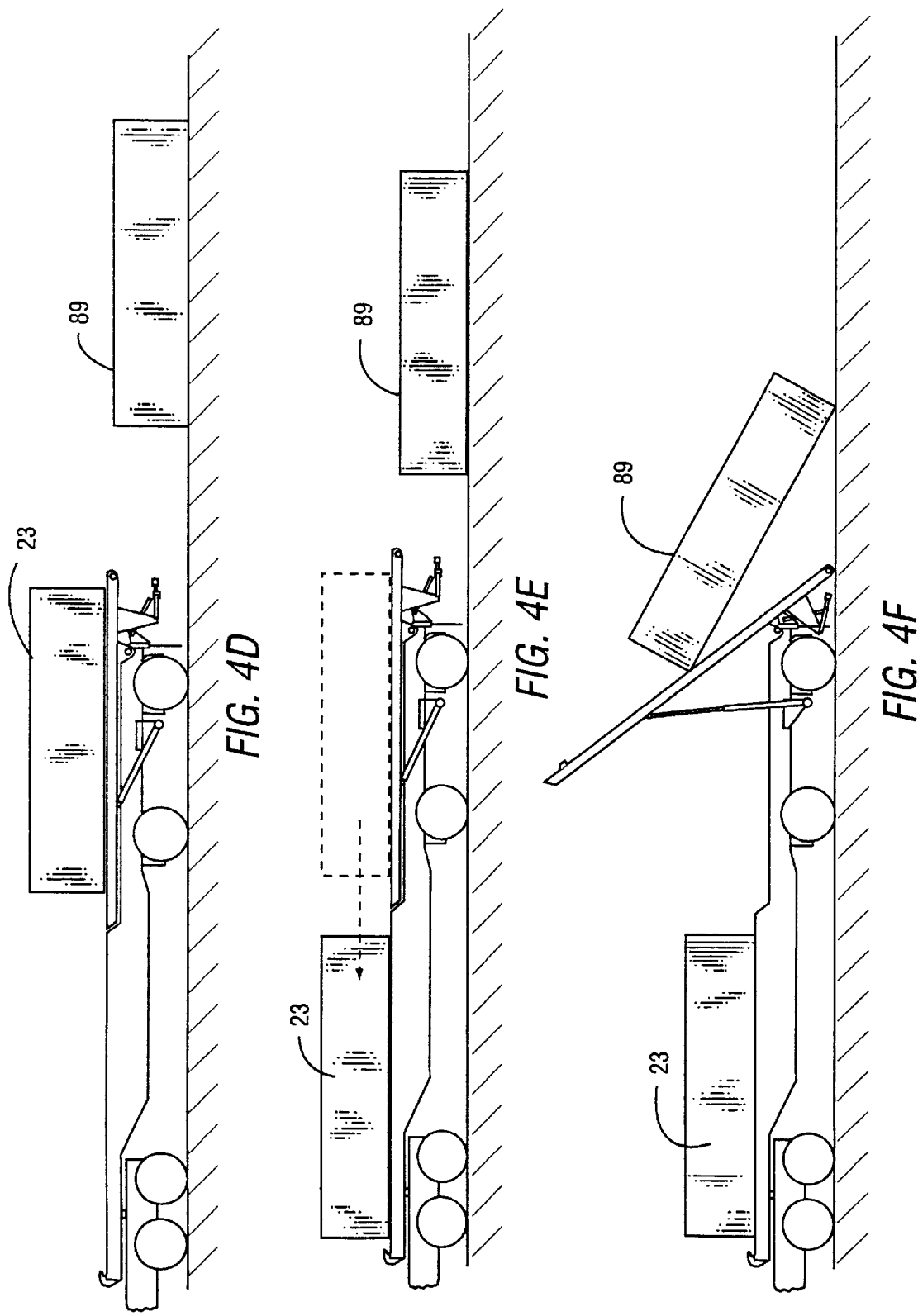

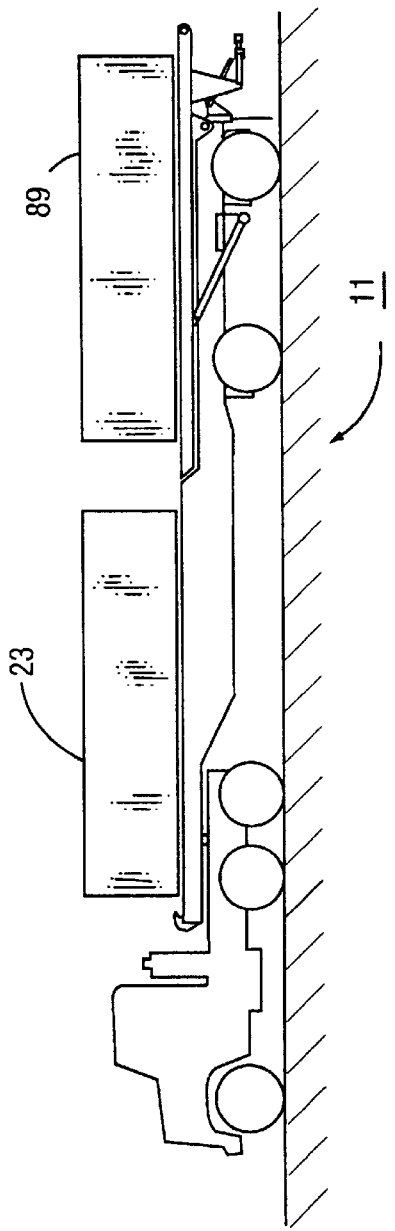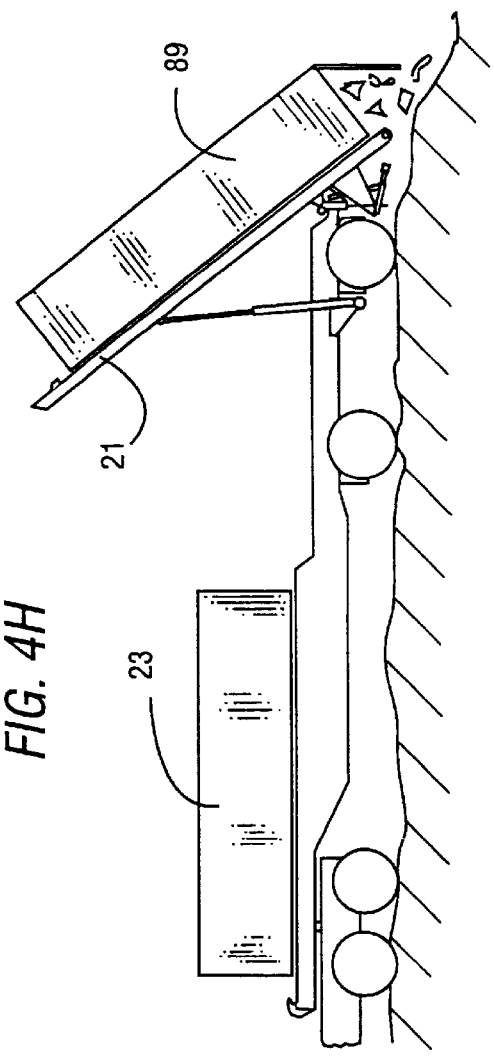

DOUBLE CONTAINER TRAILER APPARATUS AND METHOD OF USE

BACKGROUND OF THE INVENTION

1. Field of the Invention

The present invention relates generally to transport devices for loading, transporting and unloading containers and, specifically, to a transport trailer used to transport a pair containers, such as refuse containers, over a roadway.

2. Description of the Prior Art

A variety of trailer devices are known in the prior art for loading, transporting and unloading refuse and recycling type containers. These refuse and recycling containers, referred to collectively herein as "refuse" containers, are typically steel boxes with or without tops. The containers are sometimes lifted from, e.g., a site adjacent a retail store, for loading onto a truck for transport to a dump or recycling location.

Other known transport devices used in the industry include trailers which are used for transporting removable containers between job sites, storage terminals, dumping sites and the like. The trailers are towed by tractors and are equipped with hydraulic or electrical systems for loading, unloading or otherwise handling the containers. For example, an empty refuse container might be transported from a storage terminal to a job location where the container is left behind for the collection of refuse. A full container might be loaded and transported to a dumping site or back to a storage terminal. The present invention is directed to the trailer type transport device used for transporting containers.

Trailers of the above type are typically provided with an undercarriage carrying a tilt frame. The tilt frame is movable between a horizontal position for transport and a tilted or inclined position for loading, unloading and/or dumping the container contents. In the inclined position, the tilt frame defines a ramp onto which a container resting on the ground can be hoisted. When the tilt frame is lowered back to its level position, the trailer can be used to transport the container over, e.g., a roadway. To unload the container from the trailer, the tilt frame is tilted again to allow the container to slide down the inclined surface of the tilt frame onto a surrounding substrate. The unloading operation is typically accomplished through the use of a taut cable and winch arrangement or similar devices.

The above general discussion describes the operation of a trailer designed to accommodate a single container. In some situations, trailers are provided for accommodating double container loads. In such situations, only the rear trailer needs to be tiltable for loading, unloading and/or dumping. The double container trailer thus has a front half which defines a front rest position and a rear half which defines a rear rest position. Mechanisms are provided for moving a container forward and backward between the front and rear rest positions when the tilt frame is in the horizontal position.

In the operation of a typical double container trailer, the tilt frame is first inclined. A cable is attached to a first container. The first container is pulled up the inclined tilt frame by hydraulic cylinders or a winch attached to the cable. The tilt frame is then lowered to the horizontal position. The first container is moved forward into the front rest position, clear of the tilt frame, which can be tilted again to pull up the second container. The second container is loaded in the same fashion using the same pulling apparatus, but is not moved any farther forward than a rear docking position on the tilt frame.

When two containers are being transported, the front container will need to be moved forward and backward to clear the tilt frame. This necessarily complicates the driving structure needed. The existing devices use various mechanical means for moving the first container between the front and rear rest positions on the trailer main frame. The known devices may employ as many as three driving systems, each with an independent cable arrangement mounted at a different point on the trailer and terminating in a connector end attachable to one or the other of the containers.

The prior art devices have tended to be overly complicated in design and manufacture due to the fact that one trailer must tilt while the other is stationary, due to the different directions in which the force must be applied, and the different endpoints from which force must be applied. As a result, the operator was required to accomplish the attachment, detachment and stowing of multiple cables. The prior art designs also featured complicated multiple winch and trolley arrangements which were cumbersome in design and difficult to operate and maintain.

One object of this invention is to provide a double container trailer which does not require the number of steps in attaching and detaching cables as was required in the prior art devices.

Another object of the invention is to provide such a double container system which does not require the number of winches and trolleys required in the prior art devices.

Another object of the invention is to provide such an apparatus which is simple in design and economical to manufacture, which is safe and reliable in operation, which conserves the operator's time during the loading and unloading operation.

SUMMARY OF THE INVENTION

The double container trailer of the invention has a main trailer frame including a front trailer frame and a rear trailer frame, both of which define a top support surface. The rear trailer frame also includes a tilt frame pivotally mounted thereon for supporting a first load bearing container. Pivot means operatively connected between the rear trailer frame and the tilt frame are used to pivot the tilt frame and its associated container about a pivot point located on the rear trailer frame. A primary cable drive means is located on the rear trailer frame and has an engagement member for engaging a first load bearing container and transporting the first container onto the top support surface of the main trailer frame to an initial transport position. A secondary cable drive means operatively associated with the front trailer frame has an engagement member for engaging the first load bearing container and transporting the first load bearing container onto the top support surface of the main trailer frame to a final transport position forward of the initial transport position.

The pivot means comprises at least one hydraulic cylinder of the type having an associated output shaft, a selected one of the cylinder and shaft being connected to the trailer main trailer frame, the other of the cylinder and shaft being connected to the tilt frame for pivoting the tilt frame and its associated container about the pivot point located on the rear trailer frame. The primary cable drive means includes at least one hydraulic cylinder and an associated cable, actuation of the hydraulic cylinder serving to move the associated cable and engagement member to move an associated load bearing container. The secondary drive means includes a winch drum having a threaded external surface which defines a series of thread grooves and a forward cable, the forward cable being wound onto the threaded external surface of the winch drum and extending in either of opposite directions between spaced sheaves located on the trailer main frame. The engagement member is carried by the forward cable and is movable backward and forward between the spaced sheaves by actuation of the winch drum. Preferably, the external surface of the winch drum is threaded as a continuous a screw profile.

In the method of the invention, a load bearing container is moved to the initial transport position by engaging the container with the engagement member of the primary cable drive means and actuating the primary cable drive means. The load bearing container is moved to the final transport position by engaging the container with the engagement member of the secondary cable drive means. A second load bearing container is then placed on the support surface of the main trailer frame. The load bearing container is moved to the initial transport position by engaging the container with the engagement member of the primary cable drive means and actuating the primary cable drive means. The secondary drive means includes a winch drum having a threaded external surface which defines a series of thread grooves and a forward cable, the forward cable being wound onto the threaded external surface of the winch drum and extending in either of opposite directions between spaced sheaves located on the trailer main frame, the engagement member being carried by the forward cable and being movable backward and forward between the spaced sheaves by actuation of the winch drum.

Additional objects, features and advantages will be apparent in the written description which follows.

BRIEF DESCRIPTION OF THE DRAWINGS

FIG. 2A is an isolated view of a portion of the winch system of the invention showing the attachment points between the container tab and the winch shuttle;

FIG. 2B is an isolated view of the connector used to attach the container tab to the winch shuttle;

FIGS. 4A–4H are simplified schematic views of the trailer of the invention, showing the steps of loading, transporting and unloading a container.

DETAILED DESCRIPTION OF THE INVENTION

Figure 1:
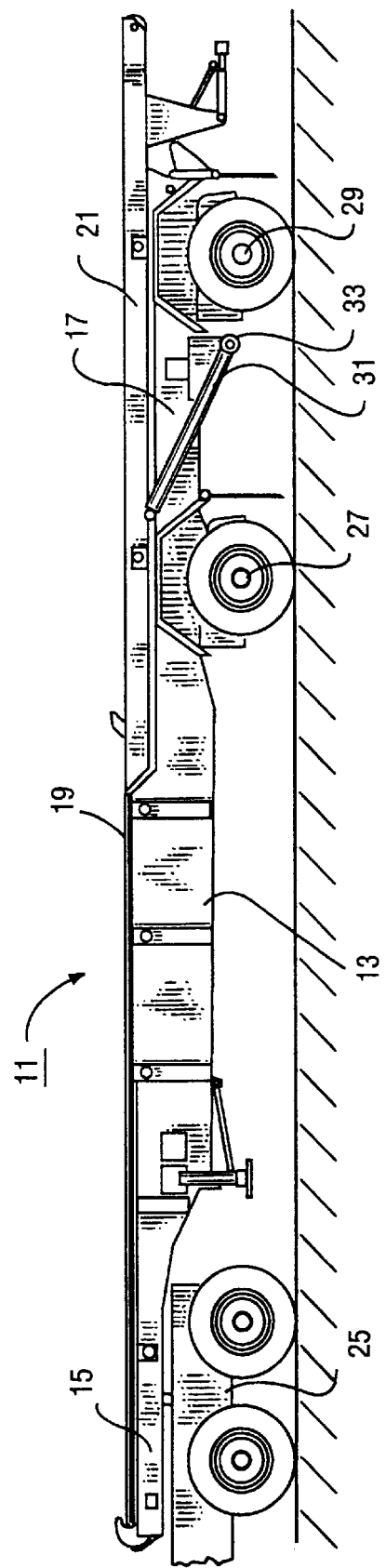
FIG. 1 is a side, perspective view of the double container trailer of the invention.

FIG. 1 shows the double container trailer of the invention designated generally as 11. The trailer 11 includes a main trailer frame 13 which is comprised of a front frame 15 and a rear frame 17. The front and rear frames 15, 17 define a top support surface 19. The rear trailer frame 17 also includes a tilt frame 21 pivotally mounted there on for supporting a first load bearing container (23 in FIGS. 2 and 4A).

Containers 23 are commercially available from a variety of sources and are used in the refuse and solid waste/sludge handling industries, as well as other industries. The containers can be opened topped or closed. For example, the containers could be used as a part of a stationary refuse compaction system. However, the device and method of the present invention have application to containers associated with both these and other industries or to open rectangular containers in general which are transported on tractor-driven trailers for delivery and drop off between remote locations.

In the embodiment of FIG. 1, a tractor 25 is shown supporting the front frame 15 of the trailer for moving the trailer between job sites, storage terminals, dumping depots, and to the like. The rear frame 17 is supported upon tandem wheel supporting axles 27,29.

Pivot means are operatively connected between the rear trailer frame 17 and the tilt frame 21 for pivoting the tilt frame and its associated container about a pivot point located on the trailer frame. In FIG. 1, the pivot means includes side mounted hydraulic cylinders (31 shown in FIG. 1) which pivot about the point 33 adjacent the rear axle 29, the cylinders 31 being moveable through a range of positions including a horizontal position shown in FIG. 1 and various degrees of inclination.

Figure 2:
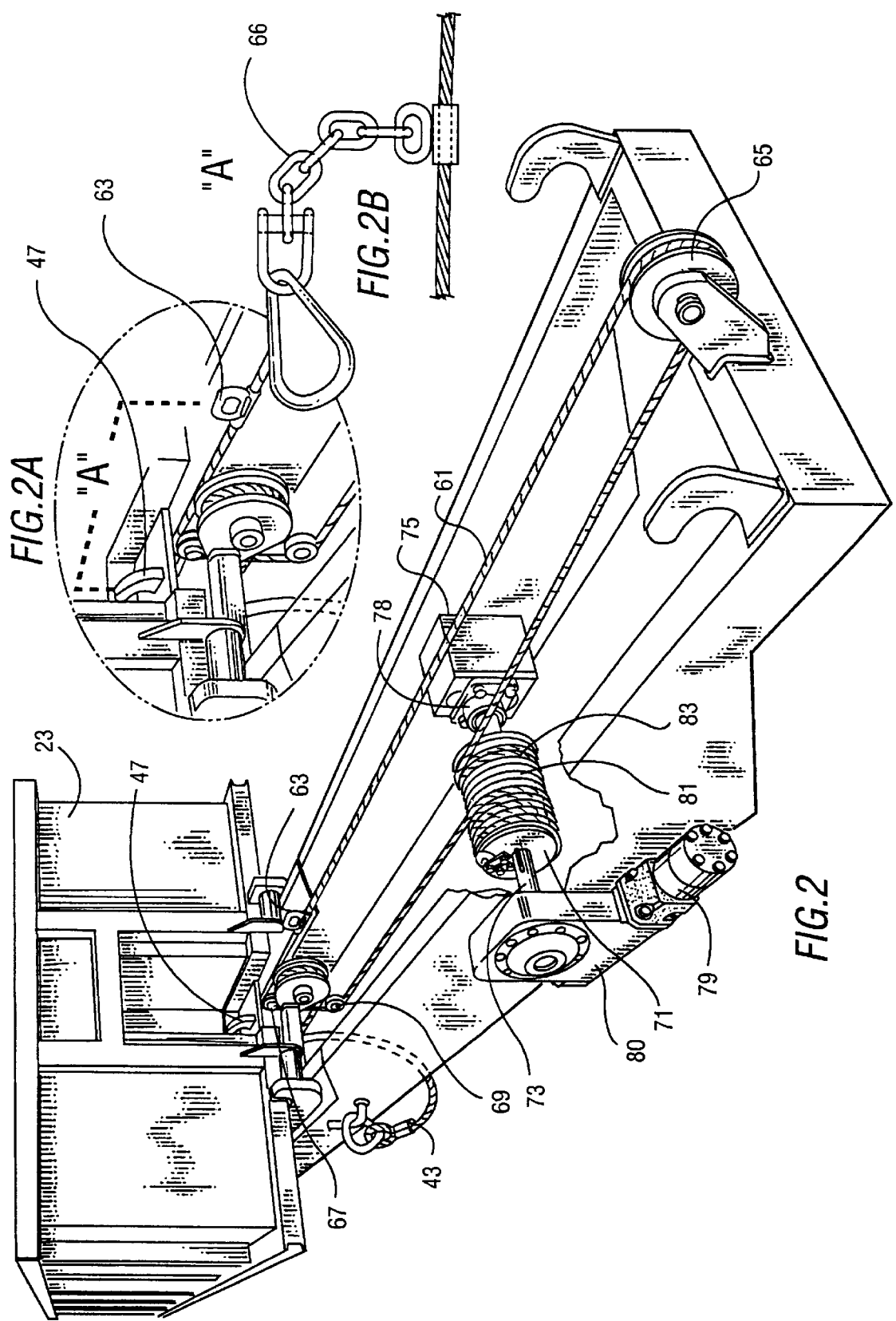
FIG. 2 is a partial perspective view of the front frame of the trailer of FIG. 1, showing the winch system of the invention.
Figure 3:
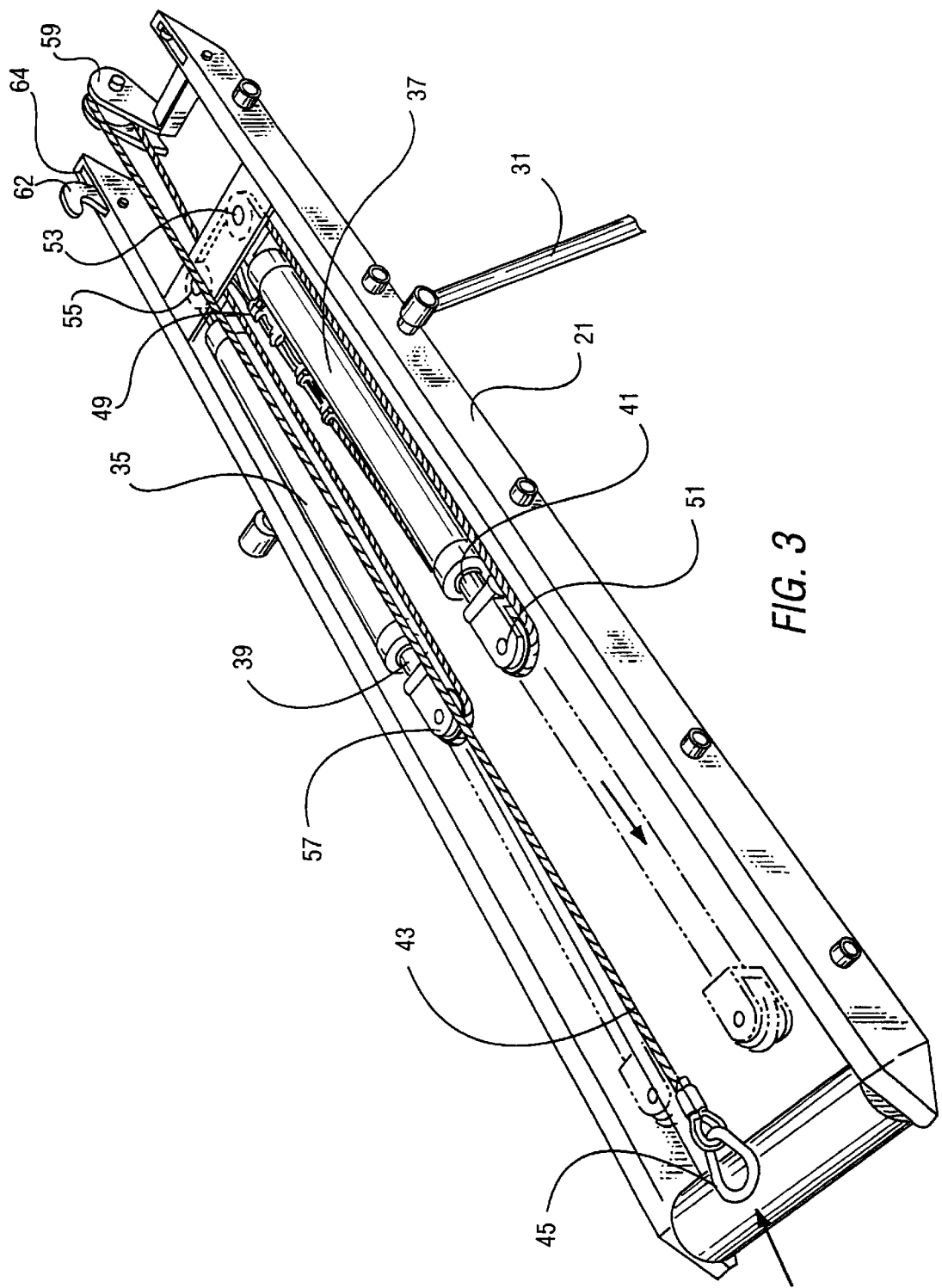
FIG. 3 is an isolated view of the rear frame of the trailer of FIG. 1, showing the double cylinders used to pull a container onto the rear frame.

As shown in FIG. 3, a primary cable drive means is located on the tilt frame 21 having an engagement member such as loop 45 for engaging a first load bearing container 23 and transporting the first container onto the top support surface of the main trailer frame to an initial transport position (FIG. 4D). The primary drive means includes a pair of hydraulic cylinders 35,37 each having an output shaft 39,41. Loop 45 on the primary cable 43 is adapted to engage a suitable tab (47 FIG. 2) on the container. A distal end 49 of the cable 43 is fixed to the cylinder 37. The cable runs about a roller 51, about sheaves 53, 55, about roller 57 and about the rear mounted sheave 59 so that extension of the piston shafts 39,41 causes the associated cable to be pulled in the direction of the arrow shown in FIG. 3. In this way, actuation of the primary cable drive means provides the motive force for transporting the first container 23 up the top support surface of the trailer frame. A drop-in stop 62 is shown in a slot 64 in frame 21. The stops can be removed or added as needed, e.g., if a second container is to be loaded onto the tilt frame 21.

FIG. 2 shows the first container 23 at approximately the initial transport position on the rear trailer frame. The primary drive cable 43 is shown in the stored position and the container is being prepared to accept the engagement member of a secondary drive means operatively associated with the front trailer frame 15. The secondary cable drive means includes a separate cable 61 which caries a shuttle element 63. A suitable chain or other connector is attached between the tab 47 on the container 23 and the shuttle element 63. FIG. 2A is an isolated view of the tab 47 and shuttle element 63. FIG. 2B shows one connector 66 which could be used to connect the tab 47 and shuttle element 63. The secondary cable drive means is then used to transport the first load bearing container 23 from the initial transport position shown in FIG. 4D to a final transport position shown in FIG. 4E.

As best seen in FIG. 2, the secondary cable 61 is routed about a forward sheave 65, vertically mounted rear sheaves 67, 69 and a winch drum 71. The winch drum 71 has an axle 73 carried between spaced bearing mounts (75 shown in FIG. 2). In the illustrated embodiment, the bearing mounts 75 are a part of the frame and house flange mount bearings 78. A hydraulic motor 79 powered by a conventional source (not shown) is used to drive the winch drum 71 by means of gear box 80 in either a forward or reverse direction. In this way, the shuttle element 63 can be caused to shuttle back and fourth between the forward sheave 65 and the rear mounted sheave 67 along the approximate length of the front frame 15 of the trailer.

Figure 5:
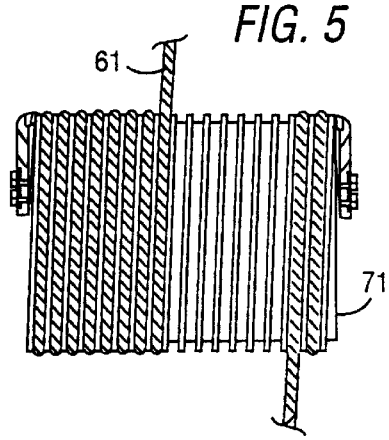
FIG. 5 is an isolated top view of the winch drum used as a part of the secondary drive means, showing the winding of the secondary cable onto the threaded external surface of the drum.
Figure 6:
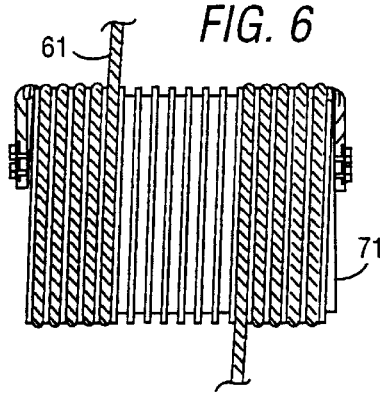
FIG. 6 is a view similar to FIG. 5 but showing the winch drum having moved to an intermediate position during the container loading procedure.
Figure 7:
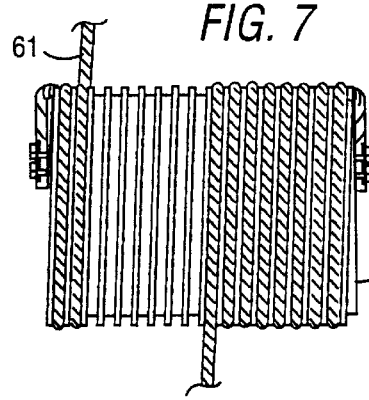
FIG. 7 is a view similar to FIG. 6 but showing the winch drum having moved to a final transport position.
Figure 5A:
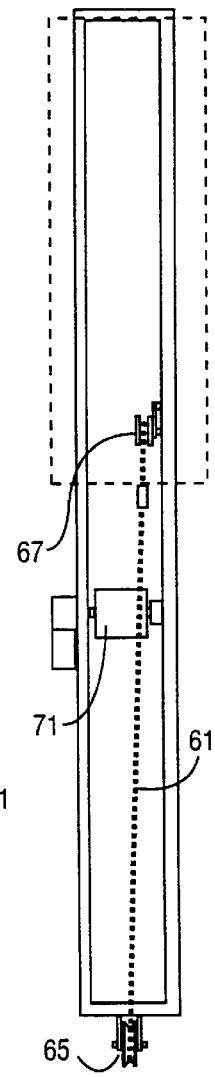
FIG. 5A is a top, schematic view of the frame of the trailer showing a first container in the initial transport position in dotted lines.
Figure 6A:
FIG. 6A is a view similar to FIG. 5A but showing the advancement of the first container which corresponds to the winch cable position of FIG. 6.
Figure 7A:
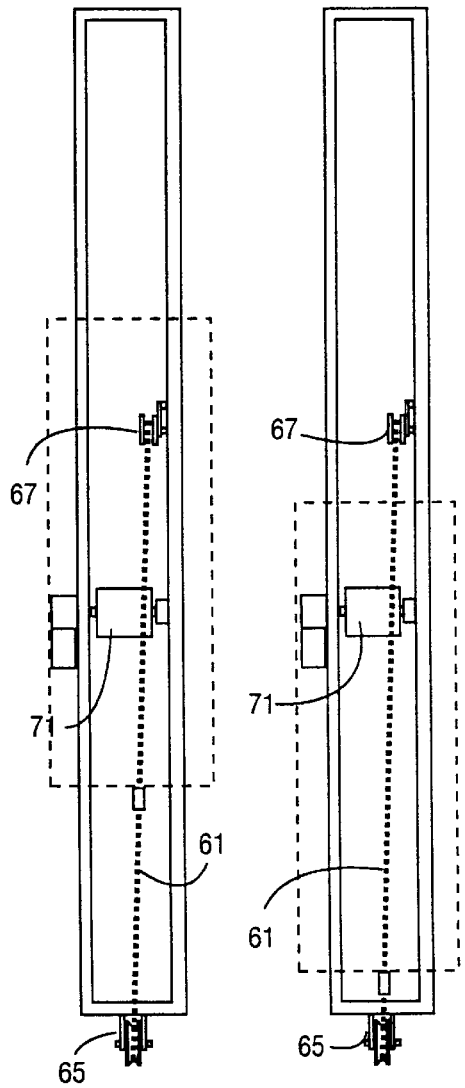
FIG. 7A is a view similar to FIG. 6A but showing the advancement of the first container which corresponds to the winch cable position of FIG. 7.
Figure 8:
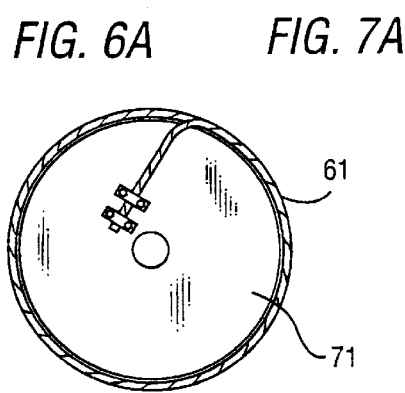
FIG. 8 is a simplified, side view taken along lines VIII—VIII in FIG. 7.

As shown in FIG. 2, the winch drum 71 has a threaded external surface which defines a series of thread grooves, such as thread grooves 81, 83, giving the external surface the profile of a bolt thread which is continuous across the external surface from one side of the winch to the opposite side thereof. As shown in FIGS. 5–7, the secondary cable 61 is wound onto the threaded external surface of the winch drum 71 in opposing directions from a central start position, whereby movement of the drum in either of opposite directions causes the associated shuttle element 63 (FIG. 2) to shuttle back and fourth between the spaced sheaves 65, 67. Because the external surface of the winch drum is threaded as a continuous screw profile, the cable does not wrap upon itself during the operation and remains taunt. FIGS. 5–7A are simplified, schematic views of the winch drum 71 showing, in exaggerated fashion, the secondary cable 61 wound from the center of the drum external surface outwardly in either of opposite directions as a first container 23 is moved from the initial transport position (FIG. 5A) to the final transport position (FIG. 7A). FIG. 8 is a side view of the drum 71 showing the end point attachment of the cable 61.

FIGS. 4A–4H illustrate the steps in the method of the present invention. As shown in FIG. 4A, the tractor 25 is used to back the rear end 85 of the trailer 11 into the vicinity of the first container 23 which is initially resting upon a surrounding support surface 87. The front portion of a second container 89 is also visible in the Figure.

In the first step of the method, the tilt frame 21 is moved to the inclined position shown in FIG. 4B by actuation of the hydraulic cylinders 35. The first load bearing container 23 is then moved to the initial transport position by first engaging the container with the engagement member (45 in FIG. 3) of the primary cable drive means and actuating the primary cable drive means. The first container 23 is shown being moved up the inclined surface of the tilt frame 21 by actuation of the primary cable drive. The tilt frame 21 is then returned to the horizontal position shown in FIG. 4D. This leaves the container 23 in the initial transport position.

The primary cable 43 is then disconnected from the container tab 47 (see FIG. 2) and the shuttle element 63 of the secondary cable drive system is attached to the tab 47. As previously mentioned, this is typically accomplished by means of a chain, short length of cable, or suitable connecting element. Actuation of the winch drum 71 by means of the hydraulic motor 75 causes the shuttle element 63 to move in the direction of the forward sheave 65. This action causes the first container to be moved from the dotted line position shown in FIG. 4E to the final transport position illustrated in FIG. 4F. A second load bearing container 89 is shown being engaged and moved up the tilt frame 21 in FIG. 4F using the identical series of steps described with respect to the first container 23. The double container trailer 11 is shown in the transport position in FIG. 4G with both containers 23, 89 resting in a horizontal position upon the support surface of the main trailer frame. The tilt frame is shown actuated in FIG. 4H so that the rear container 89 can be dumped at a land fill or other remote location.

The containers are unloaded from the trailer 11 by the reverse sequence of steps previously described. Thus, with the tilt frame in the inclined position shown in FIG. 4H, the primary cable drive mechanism is used to engage and lower the container 89 from the tilt frame 21 assisted by gravity. The trailer can also be moved forward, if necessary, to assist the unloading operation. The tilt frame 21 is then returned to the horizontal position shown in FIG. 4E and the secondary cable drive mechanism is actuated to move the front container 23 from the position shown in solid lines to the position shown in dotted lines shown in FIG. 4E. The front container 23 can then be removed from the rear frame by actuating the tilt frame as described with respect two FIGS. 4F and 4H. It is important to note that it is not necessary to disengage the shuttle element and its connector from the tab 47 of the front container to move the front container from the final transport position to the initial transport position.

An invention has been provided with several advantages. The apparatus allows two large containers to be loaded, transported and unloaded safely and efficiently. Transfer between rear and front portions of the main trailer frame is accomplished with a single winch instead of two separate winches. The front container stays attached to the transfer mechanism when moving in both the forward and rearward directions. The mechanism does not require a trolley at the front end of the trailer. The threaded drum which is utilized is threaded like a bolt and is wound in a predetermined fashion to prevent the associated cable from wrapping upon itself and breaking. The transfer mechanism is simple in design and economical to manufacture and is extremely strong and reliable in operation.

While the invention has been shown in only one of its forms, it is not thus limited but is susceptible to various changes and modifications without departing from the spirit thereof.

What is claimed is:

1. A double container trailer, comprising:

a main trailer frame including a front trailer frame and a rear trailer frame, both of which define a top support surface, the rear trailer frame also including a tilt frame pivotally mounted thereon for supporting a first load bearing container;

pivot means operatively connected between the rear trailer frame and the tilt frame for pivoting the tilt frame and its associated container about a pivot point located on the rear trailer frame;

primary cable drive means located on the tilt frame and having an engagement member for engaging a first load bearing container and transporting the first container onto the top support surface of the main trailer frame to an initial transport position;

secondary cable drive means operatively associated with the front trailer frame and having a secondary cable and an engagement member for engaging the first load bearing container and transporting the first load bearing container onto the top support surface of the main trailer frame to a final transport position forward of the initial transport position; and wherein the secondary drive means includes a winch drum having a threaded external surface which defines a series of thread grooves and a forward cable, the secondary cable being wound onto the threaded external surface of the winch drum and extending in either of opposite directions between spaced sheaves located on the trailer main frame, the engagement member being carried by the forward cable and being movable backward and forward between the spaced sheaves by actuation of the winch drum whereby the winch drum is used for moving the container forward and backward between the tilt frame and the front trailer frame.

2. The double container trailer of claim 1, wherein the pivot means comprises at least one hydraulic cylinder of the type having an associated output shaft, a selected of the cylinder and shaft being connected to the trailer main trailer frame, the other of the cylinder and shaft being connected to the tilt frame for pivoting the tilt frame and its associated container about the pivot point located on the rear trailer frame.

3. The double container trailer of claim 1, wherein the primary cable drive means includes at least one hydraulic cylinder and an associated primary cable, actuation of the hydraulic cylinder serving to move the associated cable and engagement member to move an associated load bearing container.

4. The double container trailer of claim 1, wherein the secondary cable is wound onto the threaded external surface of the winch drum in opposing directions from a central start position, whereby movement of the drum in either of opposite directions causes the associated engagement member to shuttle back and forth between the spaced sheaves.

5. The double container trailer of claim 4, wherein the external surface of the winch drum is threaded as a continuous a screw profile.

6. A method of loading a container transport trailer with a pair of load bearing containers, the trailer having a main trailer frame including a front trailer frame and a rear trailer frame, both of which define a top support surface, the rear trailer frame also including a tilt frame pivotally mounted thereon for supporting a first load bearing container, the method comprising the steps of;

providing pivot means operatively connected between the rear trailer frame and the tilt frame for pivoting the tilt frame and its associated container about a pivot point located on the rear trailer frame;

providing a primary cable drive means located on the tilt frame and having an engagement member for engaging a first load bearing container and transporting the first container onto the top support surface of the main trailer frame to an initial transport position;

providing secondary cable drive means operatively associated with the front trailer frame and having a secondary cable and an engagement member for engaging the first load bearing container and transporting the first load bearing container onto the top support surface of the main trailer frame to a final transport position forward of the initial transport position;

placing a load bearing container on the support surface of the main trailer frame;

moving the load bearing container to the initial transport position by engaging the container with the engagement member of the primary cable drive means and actuating the primary cable drive means;

moving the load bearing container to the final transport position by engaging the container with the engagement member of the secondary cable drive means;

placing a second load bearing container on the support surface of the main trailer frame;

moving the load bearing container to the initial transport position by engaging the container with the engagement member of the primary cable drive means and actuating the primary cable drive means; and wherein the secondary drive means includes a winch drum having a threaded external surface which defines a series of thread grooves and a forward cable, the forward cable being wound onto the threaded external surface of the winch drum and extending in either of opposite directions between spaced sheaves located on the trailer main frame, the engagement member being carried by the forward cable and being movable backward and forward between the spaced sheaves by actuation of the winch drum whereby the winch drum is used for moving the container forward and backward between the tilt frame and the front trailer frame.

7. The method of claim 6, further comprising the steps of:

unloading the double container trailer by first actuating the tilt frame to move the secondary container to a tilt position, followed by actuating the primary drive means to move the secondary container from the rear trailer frame to a surrounding support surface;

moving the tilt frame from the tilt position to a rest position;

thereafter, actuating the secondary drive means to move the primary container from the final transport position to the initial transport position;

unattaching the engagement member of the secondary drive means and attaching the engagement member of the primary drive means to the primary container;

actuating the primary drive means to move the primary container to the initial transport position upon the rear trailer frame; and unloading the double container trailer by actuating the tilt frame to move the primary container to a tilt position, followed by actuating the primary drive means to move the primary container from rear trailer frame to a surrounding support surface.

8. The method of claim 7, wherein the steps of moving the primary container from the final transport position to the initial transport position are accomplished without removing the secondary engagement member from the container.

9. The method of claim 8, wherein the secondary engagement member is a loop which engages a hook provided on an exterior surface of the primary container.

10. The method of claim 9, wherein the secondary engagement member shuttles back and forth in a path of travel between a pair of spaced apart sheaves located on the main trailer frame, the winch drum being located between the spaced apart sheaves on the main trailer frame.

11. The method of claim 10, wherein movement of the winch drum moves an associated container both backward and forward in direction on the front trailer frame.

12. The method of claim 11, wherein only a single winch is used to move the secondary engagement member back and forth between the spaced apart sheaves.

13. The method of claim 12, wherein the pivot means comprises at least one hydraulic cylinder of the type having an associated output shaft, a selected one of the cylinder and shaft being connected to the trailer main trailer frame, the other of the cylinder and shaft being connected to the tilt frame for pivoting the tilt frame and its associated container about the pivot point located on the rear trailer frame.

14. The method of claim 13, wherein the primary cable drive means includes at least one hydraulic cylinder and an associated cable, actuation of the hydraulic cylinder serving to move the associated cable and engagement member to move an associated load bearing container.

15. The method of claim 14, wherein the external surface of the winch drum is threaded as a continuous a screw profile.

* * * * *